United States Patent
Kyeong

(10) Patent No.: US 11,894,697 B2
(45) Date of Patent: Feb. 6, 2024

(54) AUTONOMOUS WIRELESS CHARGING SYSTEM AND METHOD BASED ON POWER LOSS TRACKING

(71) Applicant: WONCOMM CO., LTD., Daejeon (KR)

(72) Inventor: Mun Geon Kyeong, Daejeon (KR)

(73) Assignee: WONCOMM CO., LTD., Daejeon (KR)

( * ) Notice: Subject to any disclaimer, the term of this patent is extended or adjusted under 35 U.S.C. 154(b) by 649 days.

(21) Appl. No.: 17/059,432

(22) PCT Filed: Dec. 17, 2018

(86) PCT No.: PCT/KR2018/015997
§ 371 (c)(1),
(2) Date: Nov. 28, 2020

(87) PCT Pub. No.: WO2020/130162
PCT Pub. Date: Jun. 25, 2020

(65) Prior Publication Data
US 2021/0218289 A1    Jul. 15, 2021

(30) Foreign Application Priority Data

Dec. 17, 2018   (KR) .................. 10-2018-0162963

(51) Int. Cl.
*H02J 50/80*  (2016.01)
*H02J 50/10*  (2016.01)
*H02J 7/00*   (2006.01)

(52) U.S. Cl.
CPC ........ *H02J 50/80* (2016.02); *H02J 7/007182* (2020.01); *H02J 50/10* (2016.02); *H02J 2310/22* (2020.01)

(58) Field of Classification Search
CPC ...... H02J 50/80; H02J 7/007182; H02J 50/10; H02J 2310/22; H02J 50/90; H02J 50/60;
(Continued)

(56) References Cited

U.S. PATENT DOCUMENTS 8,754,608 B2 *  6/2014  Yoon ................... H02J 50/10
                                              320/108
8,907,619 B2 * 12/2014  Shukuya .............. G12B 5/00
                                              74/490.09
(Continued)

FOREIGN PATENT DOCUMENTS

CN       102882243 A     1/2013
KR       100841135 B1    6/2008
(Continued)

*Primary Examiner* — Nha T Nguyen
(74) *Attorney, Agent, or Firm* — Rabin & Berdo, P.C.

(57) ABSTRACT

The present invention relates to an autonomous wireless charging system, and more specifically, to a tray-type case and a high-precision autonomous wireless charging system based on power loss tracking, whereby, in terms of performance, the center position of a power receiving coil of a wireless device having a battery mounted therein, the wireless device being placed on top of a charger pad, is precisely tracked through a controller in the system by periodically tracking a difference in the increase/decrease of a power loss value generated in the process of foreign object detection of a power transmitter, and even when the position of the wireless device shifts, a power transmitting coil mounted in a moving device unit is accurately repositioned to the changed position through threshold value identification or, when necessary, by the selective use of a sensor matrix, thereby enabling the centers of the power transmitting coil and the power receiving coil to always coincide, and thus a maximum level of wireless charging efficiency may be constantly maintained during charging.

6 Claims, 18 Drawing Sheets

(58) Field of Classification Search
CPC ........ B60L 53/124; B60L 53/38; Y02T 10/70;
Y02T 10/7072; Y02T 90/12; Y02T 90/14
See application file for complete search history.

(56) References Cited

U.S. PATENT DOCUMENTS

| | | | |
|---|---|---|---|
| 8,981,719 B2 | 3/2015 | Inoue | |
| 9,018,900 B2 | 4/2015 | Yamamoto et al. | |
| 9,312,711 B2 | 4/2016 | Toya et al. | |
| 9,671,884 B2* | 6/2017 | Chun | G06F 3/0412 |
| 9,819,214 B2* | 11/2017 | Han | H02J 50/90 |
| 9,853,484 B2 | 12/2017 | Iwabuchi | |
| 10,158,243 B2* | 12/2018 | Kim | H02J 50/90 |
| 10,447,064 B2* | 10/2019 | Chi | H04B 5/0087 |
| 10,566,822 B2* | 2/2020 | Grant | H02J 50/10 |
| 11,005,309 B2* | 5/2021 | Bober | H02J 50/005 |
| 2014/0176057 A1* | 6/2014 | Van Wiemeersch | H02J 50/12 |
| | | | 320/108 |
| 2014/0253030 A1* | 9/2014 | Moon | H02J 50/40 |
| | | | 320/108 |
| 2016/0261135 A1* | 9/2016 | Iwabuchi | H02J 50/90 |
| 2018/0287413 A1* | 10/2018 | Jung | H02J 50/402 |
| 2019/0190324 A1* | 6/2019 | Bossetti | H02J 50/12 |
| 2019/0386522 A1* | 12/2019 | Park | H02J 50/60 |
| 2020/0083754 A1* | 3/2020 | Tian | H02J 50/10 |
| 2020/0287425 A1* | 9/2020 | Sherman | H02J 50/12 |
| 2023/0268780 A1* | 8/2023 | Swaans | H02J 50/90 |
| | | | 307/104 |

FOREIGN PATENT DOCUMENTS

| | | |
|---|---|---|
| KR | 1020080081480 A | 9/2008 |
| KR | 1020110034773 A | 4/2011 |
| KR | 1020120014878 A | 2/2012 |
| KR | 1020120099571 A | 9/2012 |
| KR | 1020120117262 A | 10/2012 |
| KR | 101250290 B1 | 4/2013 |
| KR | 1020140019955 A | 2/2014 |
| KR | 1020140067101 A | 6/2014 |
| KR | 1020140085591 A | 7/2014 |
| KR | 1020150054887 A | 5/2015 |
| KR | 101701054 B1 | 1/2017 |
| KR | 1020170008800 A | 1/2017 |
| KR | 1020170019629 A | 2/2017 |
| KR | 1020170140734 A | 12/2017 |

* cited by examiner

| Features sought<br>Structure of system | Convenience (Coil alignment sensitivity) | Effective charging efficiency $E_{eee}$ | Degree of freedom (Alignment-free usability) | Cost effectiveness (Product cost vs. Performance and service quality) | Human hazardness | Universality (Device model-independent chargeability) |
|---|---|---|---|---|---|---|
| 1-to-1 Coil | Inconvenient (Sensitive to charging position alignment) | Low (Mostly $E < E_{max}$ or $E \ll E_{max}$) | Low | High | Harmless | Nonuniversal (Stand/Pocket /Universal Pad) |
| 1-to-N Coil | Average (Alignment still needed in stand type charger) | Average (Mostly $E < E_{max}$ or $E \ll E_{max}$) | Average | Average | Harmless | Nonuniversal (Stand /Universal Pad) |
| Autonomous Charging 1-to-1 Coil | Highly Convenient (No alignment needed, completely one-drop autonomous charging) | Always High (Always $E \approx E_{max}$) | Very High | Very High | Harmless | Completely Universal (Stand/Pad/Pocket) |

FIG. 9

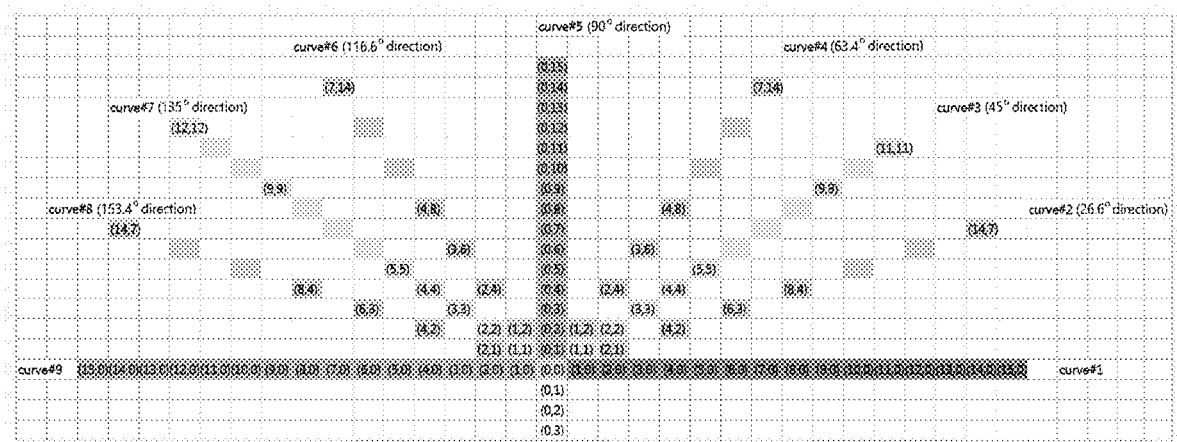
(a)
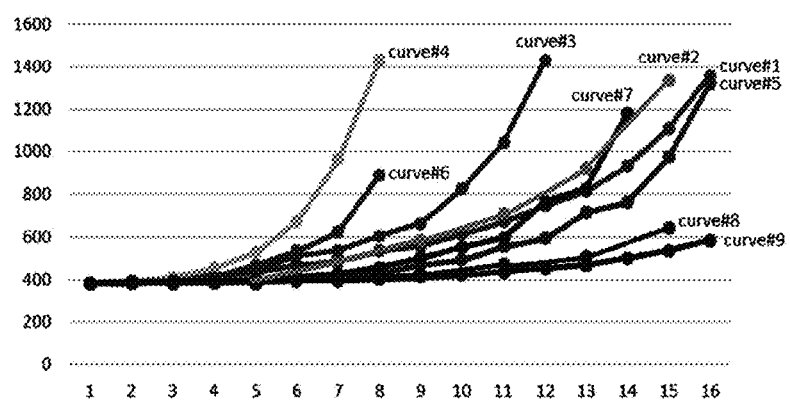
(b)
FIG. 14

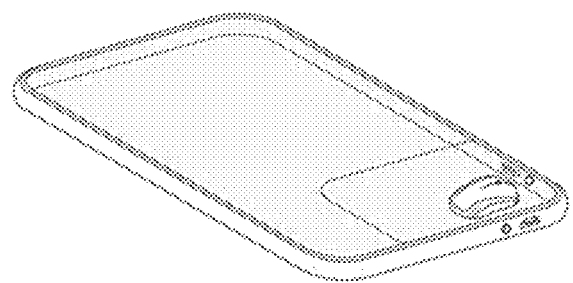
(a)
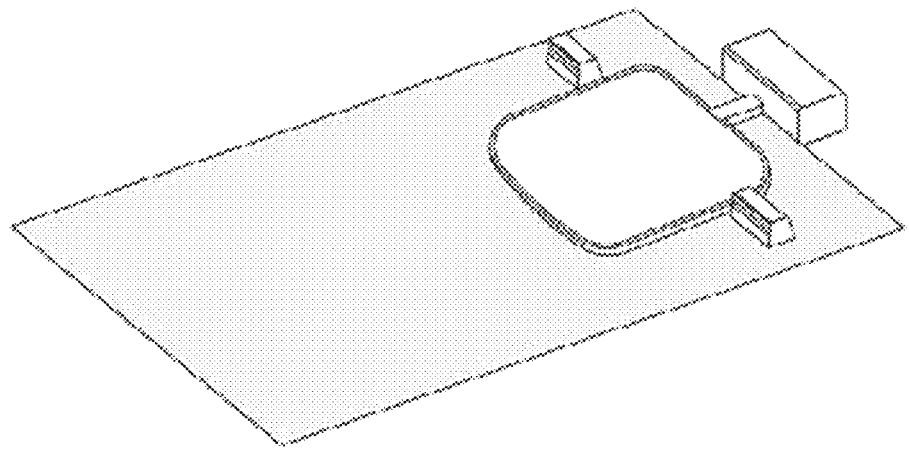
(b)
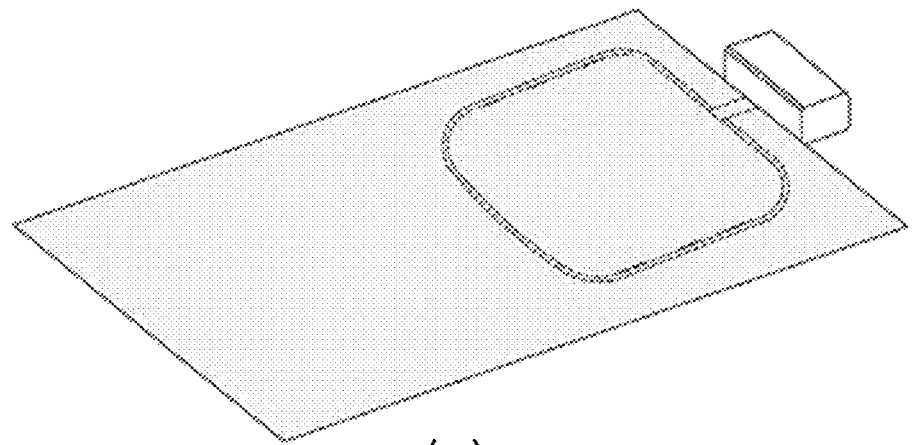
(c)
FIG. 18

AUTONOMOUS WIRELESS CHARGING SYSTEM AND METHOD BASED ON POWER LOSS TRACKING

TECHNICAL FIELD

In a wireless charging system, there are two methods: a method in which a user who wants charging adjusts a charging position manually for induction; and a so-called "free-positioning" method in which a charging system causes a center position of a power transmitting coil to find and move to a center position of a power receiving coil. In such a free-positioning method, various techniques may be applied to determine whether an object to be charged is present and to determine the position thereof. A currently well-known method utilizes a position detection device that uses a position detection circuit board composed of an array of X-axis loop coils and an array of Y-axis loop coils, and also uses a current sensing detector. Using this method, a charger determines whether an object to be charged has entered a chargeable area, detects the position of the object to be charged, and moves the power transmitting coil so as to perform optimum charging. However, such a method has a disadvantage because implementation of a loop coil circuit board covering the entire area of a pad results in an increase in cost and a highly reliable method of detecting the presence of an object to be charged is required.

The present invention relates to an autonomous wireless charging system. More particularly, in terms of performance, the present invention relates to a tray-type case and an autonomous wireless charging system based on power loss tracking with high precision, wherein a center position of a power receiving coil of a battery-equipped wireless device placed on a pad of a charger is precisely tracked by periodically tracking a difference in an increase and a decrease of a power loss value generated in a process of foreign object detection (FOD) by a power transmitter through a microcontroller unit (MCU) (hereinafter, referred to as a "controller") in a control unit of the system. Even when a position of the wireless device is displaced, a power transmitting coil with which a moving unit is equipped is exactly moved to the displaced position through identification of a threshold or a matrix of sensors selectively used, so that the center of the power transmitting coil and the center of the power receiving coil are always aligned. Consequently, during charging, the best wireless charging efficiency is always maintained. In terms of system, the present invention relates to a tray-type case and an autonomous wireless charging device based on power loss tracking with high hardware and cost efficiency, wherein a position tracking circuit board is not used in moving the transmitting coil, so that the free-positioning wireless charging system significantly increases hardware efficiency. In addition, the present invention provide the best wireless charging efficiency by optimally adapting to the wireless device placed on the pad while the transmitting coil is moved vertically and horizontally only by a predetermined distance a stroke zone (a possible range in which the center position of the power receiving coil is positioned when the wireless device is positioned on the pad of the charger).

BACKGROUND ART

In a magnetic induction method, the near-field energy of a power induction coil from electromagnetic waves is coupled to a power reception induction coil, thereby achieving efficient energy.

However, most of the existing wireless chargers using an magnetic induction method requires user's effort to place a wireless device to an exact position for charging, so that the structure cannot always maintain the optimum wireless charging efficiency and cannot optimally shorten the charging time.

As shown in FIG. 1 and Patent Document 13 to Patent Document 16, a wireless charger that moves the coil is cost inefficient because a circuit for detecting the position of the wireless device placed on the pad has almost the same size as the area of the pad.

In addition, due to the characteristics of a mechanism design of a moving unit, there is a dead zone where wireless charging cannot be performed. The economic efficiency is low due to a large number of components. The moving unit moves a relatively long distance from a standby position to a position for detecting a power receiving coil or vice versa, so that a driving device with high torque and high rpm needs to be used, thus causing noise. Due to one-sided driving, the torque of a motor becomes larger. When the power transmitting coil moves away far from the driving part, jamming may occur.

Therefore, chargers (wireless chargers for free-positioning) for freely placing a wireless device on the pad have been proposed, but it is evaluated that the chargers do not fully perform their role or are not cost efficient.

Accordingly, there is a need for a wireless charging system and method that solve the major disadvantages and inconveniences occurring in terms of system and transmit power efficiently and safely.

The existing wireless chargers based on a flat-type case performs charging even when the wireless device is placed slightly on the corner of the charger. Therefore, the stroke zone in which the power transmitting coil moves is large, compared to charging the wireless device positioned within the pad.

Therefore, when the wireless device is placed slightly on the corner of the flat-type case pad, the power transmitting coil needs to move as quickly as possible to the position where the power transmitting coil can move as far as possible, in order to align the power transmitting coil with the power receiving coil of the wireless charger into the coaxial line.

In addition, there is a problem that relatively loud noise occurs in the process of moving to a far position on the flat-type pad for a long time.

In addition, in the case of the flat-type pad, basically, the center of the power transmitting coil of the charger needs to be moved to the center position of the receiving coil of the wireless device whenever necessary. Wherever the wireless device is placed within the pad, it is necessary to guarantee the optimum charging efficiency, which in fact requires excessive material costs and parts costs. Accordingly, problems with the size of operating power and durability occur.

In addition, as shown in Patent Document 5, in many cases, an in-vehicle wireless charging unit system is installed inside a console in the front of the vehicle and is used. However, due to the nature of a moving vehicle, when the system is exposed to a driving environment (mounds, curves, sudden stops, and the like) where the position of the smartphone placed inside the vehicle is easily displaced, and when the position of the smartphone moves away from the center of the charging pad, the charging efficiency rapidly decreases. Thus, normal charging is not achieved, and even heat is severely generated. In this case, charging is automatically stopped depending on a vehicle manufacturer.

In a 3-coil type of a free-positioning wireless charging service that is currently employed in most vehicle interiors, freedom and stability of charging that should be given to the wireless charging users are still greatly limited in practice.

Furthermore, in all current in-vehicle wireless charging units, normal charging is limited depending on the smartphone model. This is because in the case of most existing wireless charging consoles (largely divided into a horizontal storage type, an slanted stand type, and a pocket insertion type), it is impossible to match the center position of the power receiving coil of all types of smartphones to the center position of the power transmitting coil that has a fixed position within the installed wireless charging module.

Currently, in the global vehicle market, about 80 vehicle models or more equipped with a wireless charging function are manufactured and sold, but do not implement a wireless charging technique for providing "decisive convenience, stability, and freedom" in the vehicle.

That is, every vehicle manufacturer has problems of inconvenience, non-adaptability, and reluctance to inform customers of smartphone models that cannot be charged depending on a W×L dimension of the smartphone on the pad in the console holding the smartphone.

DOCUMENTS OF RELATED ART (Patent Document 1) Korean Patent Application Publication No. 2014-0067101 (Jun. 3, 2014)

(Patent Document 2) Korean Patent Application Publication No. 2014-0085591 (Jul. 7, 2014)

(Patent Document 3) Korean Patent Application Publication No. 2015-0054887 (May 20, 2015)

(Patent Document 4) Korean Patent Application Publication No. 2017-0008800 (Jan. 24, 2017)

(Patent Document 5) Korean Patent No. 1701054 (Jan. 23, 2017)

(Patent Document 6) Korean Patent Application Publication No. 2012-0099571 (Jul. 11, 2012)

(Patent Document 7) Korean Patent No. 0841135 (Jun. 18, 2008)

(Patent Document 8) Korean Patent No. 1250290 (Mar. 28, 2013)

(Patent Document 9) Korean Patent Application Publication No. 2008-0081480 (Sep. 10, 2008)

(Patent Document 10) Korean Patent Application Publication No. 2012-0014878 (Feb. 20, 2012)

(Patent Document 11) Korean Patent Application Publication No. 2014-0019955 (Feb. 18, 2014)

(Patent Document 12) Chinese Patent Application Publication No. 102882243 (Jan. 16, 2013)

(Patent Document 13) U.S. Pat. No. 8,981,719 (Mar. 17, 2015)

(Patent Document 14) U.S. Pat. No. 9,018,900 (Apr. 28, 2015)

(Patent Document 15) U.S. Pat. No. 9,312,711 (Apr. 12, 2016)

(Patent Document 16) U.S. Pat. No. 9,853,484 (Dec. 26, 2017)

DISCLOSURE

Technical Problem

The present invention is directed to providing an autonomous wireless charging system, wherein in order to solve the problem that hardware is not efficient due to a large area of a position detection circuit board for a power receiving coil, the structural problem that there is a dead space where wireless charging cannot be performed, and the resulting problem of cost inefficiency, position detection is performed through a structure for moving the power transmitting coil only within the stroke zone, and without using a circuit for detecting a center position of the power receiving coil, the power transmitting coil is moved within a predetermined time in the direction of a sensed position through periodic monitoring of power loss values calculated from an algorithm for detecting a foreign object, thereby charging a wireless device and greatly increasing hardware and cost efficiency.

In addition, the present invention is directed to providing an autonomous wireless charging system, wherein an X-axis motor and a Y-axis motor are inserted into through-holes connecting a space between a slider and a Y-axis rail and a space between the Y-axis rail and an X-axis rail, so that movement along the X-axis rail and the Y-axis rail is not obstructed and the hardware is produced as slim as possible.

Technical Solution

According to the present invention, there is provided an autonomous wireless charging system based on power loss tracking, wherein a tray-type case is employed; a controller sets a basic value or a threshold value on the basis of a power loss value generated in a process of detecting a foreign object by a power transmitter; a power transmitting coil is moved within a predetermined time in a direction of a sensed position through periodic monitoring of the power loss value so that a wireless device is autonomously charged; when a position of the wireless device is displaced, position tracking is performed again; and the power transmitting coil is moved only within a stroke zone that is positioned at a center portion of the autonomous wireless charging system and that moves vertically and horizontally.

The autonomous wireless charging system charges the wireless device and includes: the controller, provided inside the autonomous wireless charging system, detecting the position of the wireless device; and a moving unit moving the power transmitting coil only within the stroke zone in cooperation with the controller.

The autonomous wireless charging system charges the wireless device and includes: a control unit identifying, when the position of the wireless device is displaced, a difference with the threshold value so as to move the transmitting coil again; or calculating, by using a matrix of sensors selectively when necessary, displacement of the position of the wireless device, or whether the wireless device is removed and a displaced direction of the displaced wireless device so as to move the transmitting coil again.

The moving unit may use an X-Y guide employing a slide bearing method in which a driving part is placed between a guide rail and a slider.

The present invention may be applied to an internal charging device of any one among a combination of stationery and charger; a tray-type charger; furniture, such as an office desk, a sofa, and the like; a treadmill; a front console for a vehicle; a wireless rechargeable gaming mouse pad; a smartphone charging pad; and a garage and a parking lot using an overground or underground pad for charging an electric vehicle.

Advantageous Effects

According to the present invention, without using a position detection circuit board, the center of the power transmitting coil and the center of the power receiving coil are aligned through tracking of a position of an object to be charged, by using a power loss value used in a process of detecting a foreign object by the power transmitter, whereby the charging efficiency can be maximized. Herein, the effective charging efficiency of the autonomous wireless charging system based on power loss tracking is defined as $E_{max}$ (the maximum effective charging efficiency that the system provides at any position on the pad). That is, $E_{max}$ is the maximum charging efficiency that the charging system can provide.

In addition, according to the present invention, a tray-type case has a structure that reduces the stroke zone of the moving unit about four times or more, compared to a flat-type case. Therefore, the size and the moving distance of the moving unit are reduced. In addition, a position detection circuit board is not employed, so that the assembly complexity and the stacking thickness of wireless charging system can be reduced.

In addition, the present invention has a structure in which a driving part (a drive motor, and a rack and pinion gear) is placed between a guide rail (X- or Y-axis rail) and a slider, so that a dead space is removed. When the present invention is applied to a vehicle, stable movement (gentle movement, and removal of noise) is achieved.

In addition, the present invention is applied to an internal charging device of any one among a tray-type case limiting the mounting position of the wireless device; a combination of stationery and autonomous wireless charger; a tray-type autonomous wireless charger; furniture, such as an office and conference room desk, a sofa, and the like; a treadmill; various in-vehicle consoles; a charging pad for both a wireless rechargeable gaming mouse and a smartphone; and a garage and a parking lot using an overground or underground pad for charging an electric vehicle. The present invention has many application fields.

In addition, when the autonomous wireless charging system is embedded in a required spot of a place and building to which power is supplied, for example, a conference room or a cafe, furniture such as a hotel table, an office desk, a home sofa, an interior of a vehicle, and a garage or parking lot, the present invention always guarantees the performance of the maximum charging efficiency and provides unprecedented decisive convenience. Thus, the present invention can provide remarkable freedom and satisfaction of charging that change the style of charging for the user.

DESCRIPTION OF DRAWINGS

FIG. 9 is a comparison table illustrating the remarkable difference in effects when autonomously executing a wireless charging system using one power transmitting coil according to an embodiment of the present invention.

FIG. 14 is graphs illustrating distribution of power loss values and consistency of increase and decrease thereof, respectively, according to a distance between a power transmitting coil and a power receiving coil in an autonomous wireless charging system based on power loss tracking, as an embodiment of the present invention.

FIG. 18 is a diagram illustrating various types of embodiments, such as a charging pad for both a wireless rechargeable mouse and a smartphone, and a garage and a parking lot for charging electric vehicles, in an autonomous wireless charging system based on power loss tracking according to an embodiment of the present invention.

BEST MODE

Figure 1:
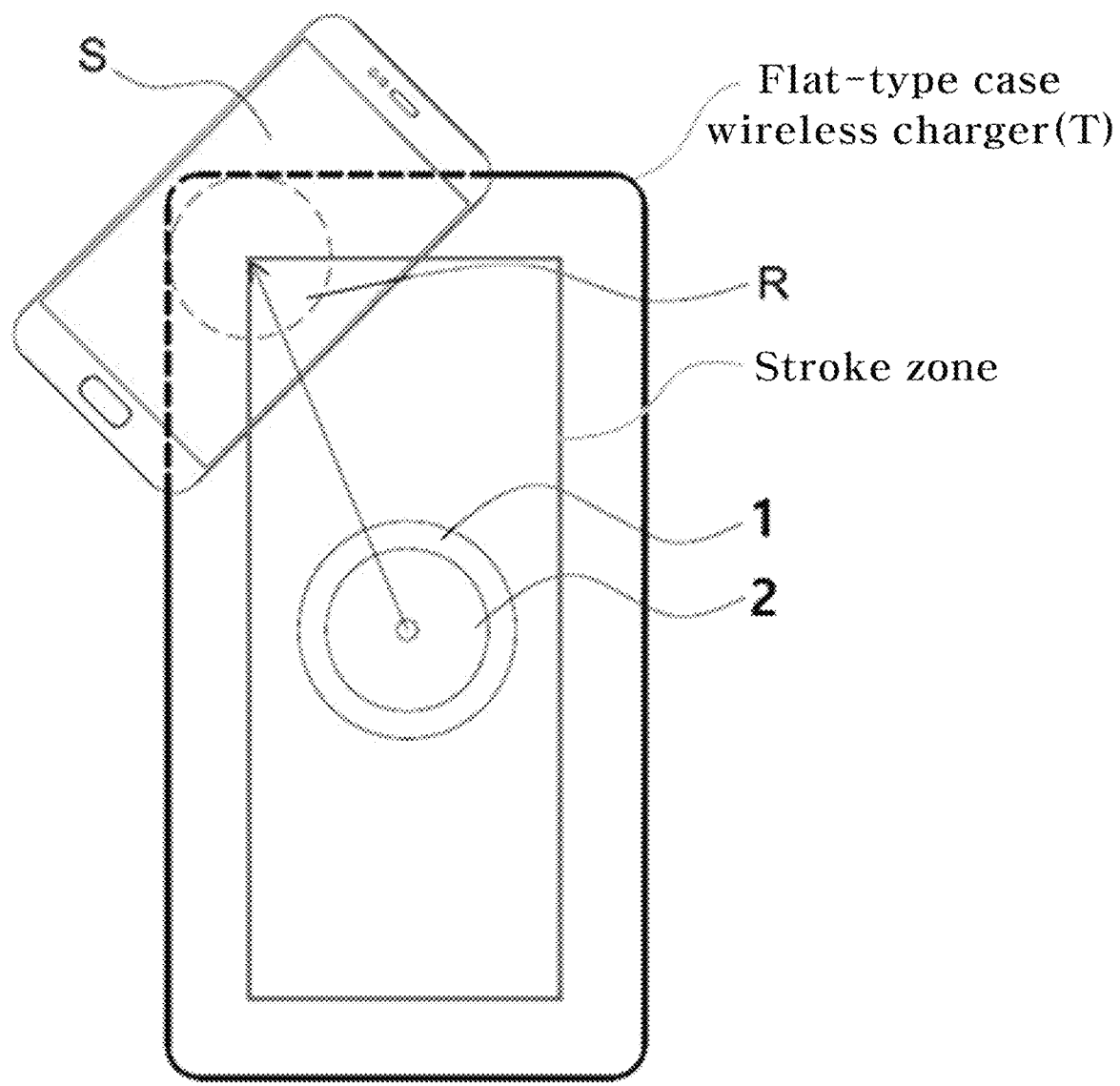
FIG. 1 is a diagram illustrating an example of arrangement of a power transmitting coil and a power receiving coil in the related art of a flat-type case wireless charger, wherein a center of the power transmitting coil moves to a corner side within a large stroke zone towards a center point of the power receiving coil.

According to the best mode of the present invention, there is provided an autonomous wireless charging system based on power loss tracking, wherein a tray-type case is employed; a controller sets a basic value or a threshold value on the basis of a power loss value generated in a process of detecting a foreign object by a power transmitter; a power transmitting coil is moved within a predetermined time in a direction of a sensed position through periodic monitoring of the power loss value so that a wireless device is autonomously charged; when a position of the wireless device is displaced, position tracking is performed again; and the power transmitting coil is moved only within a stroke zone that is positioned at a center point of the autonomous wireless charging system and that moves vertically and horizontally.

MODE FOR INVENTION

Hereinbelow, to understanding the invention, preferred embodiments of the present invention will be described in detail with reference to the accompanying drawings. It should be understood that the embodiment of the present invention may be changed to a variety of embodiments and the scope and spirit of the present invention are not limited to the embodiments described hereinbelow. The embodiments of the present invention are provided in order to fully describe the invention for those skilled in the art. Therefore, shapes and sizes of the elements in the drawings may be exaggerated for more precise description. It is noted that the same reference numerals will be used throughout the drawings to denote the same elements. In addition, in the following description of the present invention, a detailed description of known functions and configurations will be omitted when it may make the subject matter of the present invention unclear.

FIG. 1 shows an example of arrangement of a power transmitting coil 2 and a power receiving coil R in the related art, wherein in order to track a position of a wireless device S placed on a flat-type case pad, the power transmitting coil 2 is moved to the corner of the pad towards the power receiving coil R by using a detection circuit board in a size similar to the area of the pad. This case causes the following several disadvantages: the presence of a dead space on the pad, a large moving unit of screw type moving by a relatively long distance, lack of durability, loud noise, operation of a number of components, and high production expense.

Figure 2:
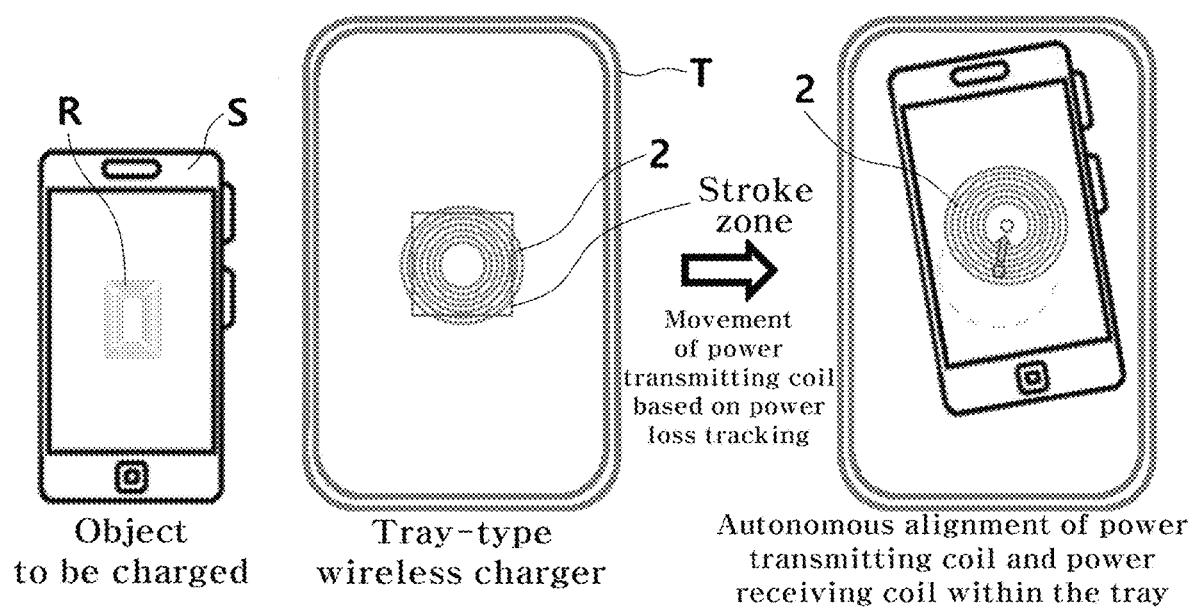
FIG. 2 is a diagram illustrating an example of arrangement of a power transmitting coil and a power receiving coil, wherein a tray-type wireless charger is employed. According to the present invention, a center of the power transmitting coil moves to a center position of the power receiving coil only within a very small stroke zone.

FIG. 2 shows an example of arrangement of a power transmitting coil 2 and a power receiving coil R within a very small stroke zone of a tray-type wireless charger T instead of a large stroke zone that a flat-type case pad has. Therefore, it is economical because the moving distance is short and the design dimension of a motor or a mechanical part is reduced. In addition, the torque of a motor also has a margin and the noise caused by rotation of the motor is low because moving by a long distance rarely occurs. Further, a moving unit using an X-Y guide employing a slide bearing method also secures durability so that it can withstand quite strong vibration and impact. Unlike the related art, tracking the center position of the power receiving coil R on the basis of power loss tracking according to the present invention does not require a position tracking circuit board, and is thus relatively more economical.

Figure 3:
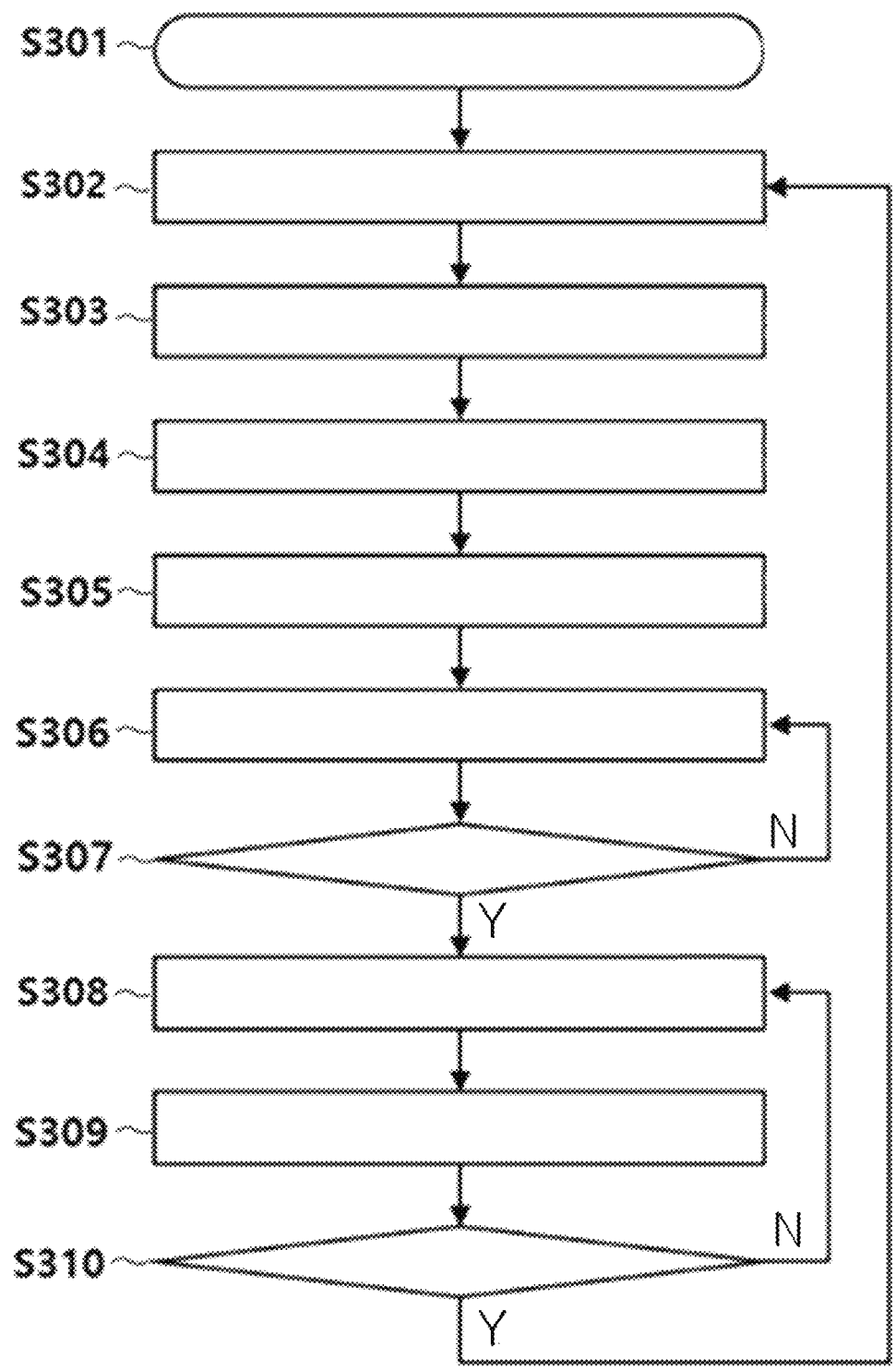
FIG. 3 is a flowchart illustrating overall operation of an autonomous wireless charging system based on power loss tracking according to the present invention.

FIG. 3 shows the overall operation of an autonomous wireless charging system based on power loss tracking according to the present invention. When the system power is turned on at step S301, a power transmitting coil 2 of a moving unit 4 moves to the center position of the system that is in a standby mode state at step S302. A power loss value is sensed through communication with a power unit 3 at step S303. When the sensed data value is an effective value, a moving direction of the moving unit 4 is selected at step S304. Herein, the moving direction is calculated for an X axis and a Y axis each. The sensed value is stored at step S305, and the moving unit 4 is moved at step S306. It is checked whether the sensed value is effective at step S307. Herein, when the sensed data value is effective, it means that the value is steadily increased or decreased. The moving direction of the moving unit 4 is determined on the basis of whether the value is effective. When the value is effective, the moving unit 4 is stopped at step S308. When the value is not effective, the moving unit 4 is moved at step S306 and the power loss value is sensed again to keep determining whether the value is effective. When the sensed value is not effective, the moving unit 4 is stopped at step S308 and the power loss value is sensed at step S309. It is identified whether there is a change in the sensed power loss value at step S310. When there is a change, the moving unit 4 is moved to the center position at step S302. When there is no change, the moving unit 4 goes into a stop state and the subsequent steps are repeated.

Figure 4:
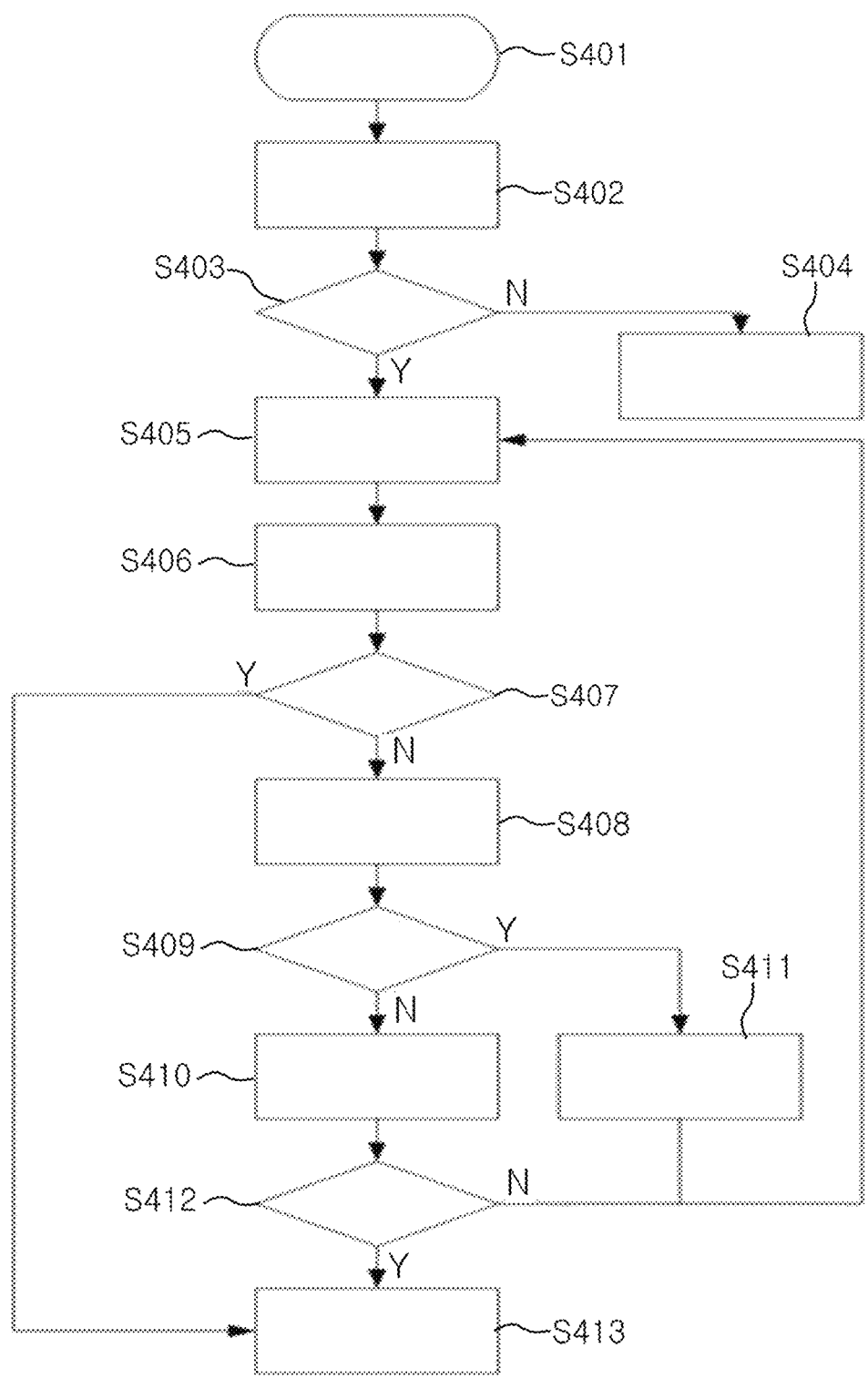
FIG. 4 is a flowchart illustrating control of a moving unit of an autonomous wireless charging system based on power loss tracking according to the present invention.

FIG. 4 shows the movement (S401) of moving unit 4. The direction of the moving unit 4 is determined at step S402. When it is identified that the moving direction is determined at step S403, the moving unit 4 is moved to the determined moving direction by a predetermined distance at step S405. Then, the sensed value is stored and a virtual position value is updated at step S406. When the moving direction is not determined, proceeding to a loop S404 of selecting the direction of the moving unit 4 takes place. After the moving direction is calculated at step S404, it is identified whether the moving direction is determined at step S403, and it is determined whether to move by a predetermined distance. Herein, the updating of the virtual position means moving by a predetermined distance to the virtual position of the moving unit 4. The updating is necessary to prevent an overrun and return to the center position after moving is stopped. Regarding the present invention, the virtual position is related to the stroke zone. When the moving unit 4 has actually moved to remember the position of the boundary line that should not be crossed, namely, the range in which the moving unit is allowed to move, the virtual position is also updated. There are two virtual position variables on the X axis and the Y axis. Therefore, when it is identified that the virtual position value exceeds the range at step S407, the power loss value is sensed at step S408, and it is determined whether the sensed value is decreased at step S409. When the value is decreased, an error counter is initialized at step S411, moving to the moving direction by a predetermined distance is performed at step S405, and the remaining steps are repeated. When the value is not decreased, it means that the direction has changed. Thus, the error counter is increased by one at step S410. It is identified whether the error counter is the maximum value at step S412. When the maximum value is reached, proceeding to a step S413 of stopping the moving unit 4 takes place. Otherwise, moving towards the moving direction by a predetermined distance is performed at step S405 and the remaining steps are repeated.

Figure 5:
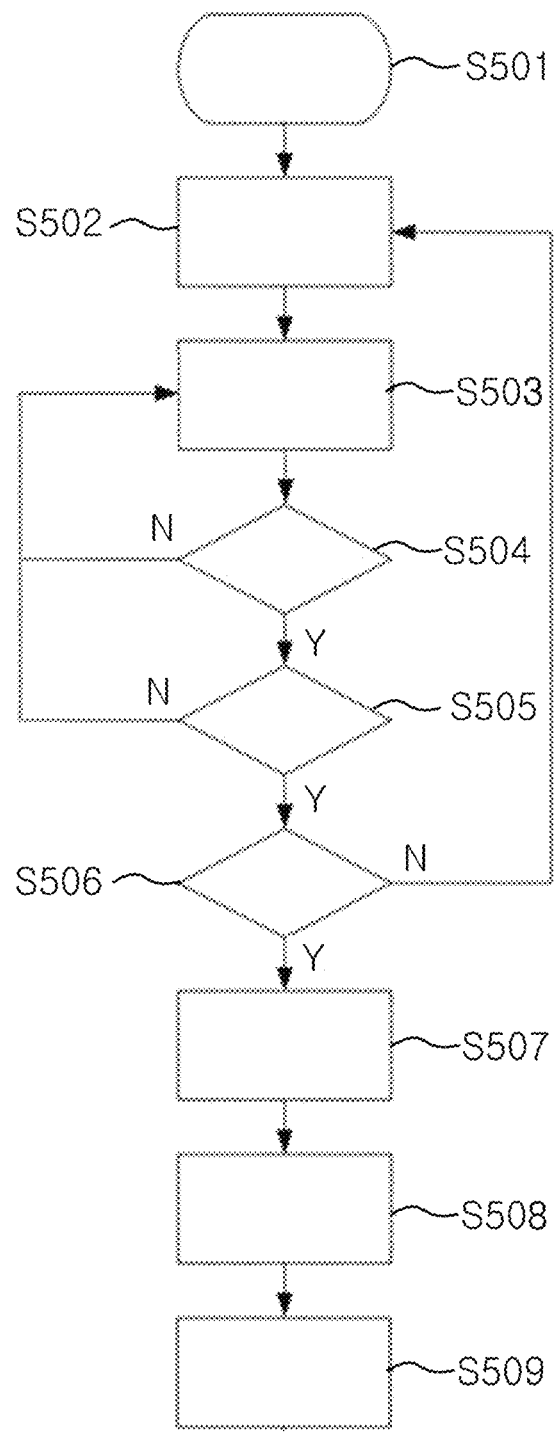
FIG. 5 is a flowchart illustrating operation during charging after a moving unit of an autonomous wireless charging system based on power loss tracking is stopped according to the present invention.

FIG. 5 shows the operation (S501) during charging after the moving unit 4 is stopped. When the moving unit 4 is stopped, the motor is stopped at step S502, the power loss value is sensed at step S503, and it is determined whether the sensed value is effective at step S505. However, before the step S505, it is determined whether full charge is reached at step S504. When full charge is reached, it is determined whether the sensed value is effective at step S505. When the sensed value is increased at step S506, the moving unit 4 is returned to its original position at step S507, updates the virtual position at step S508, and proceeds to a step S509 of controlling the moving unit 4.

Figure 6:
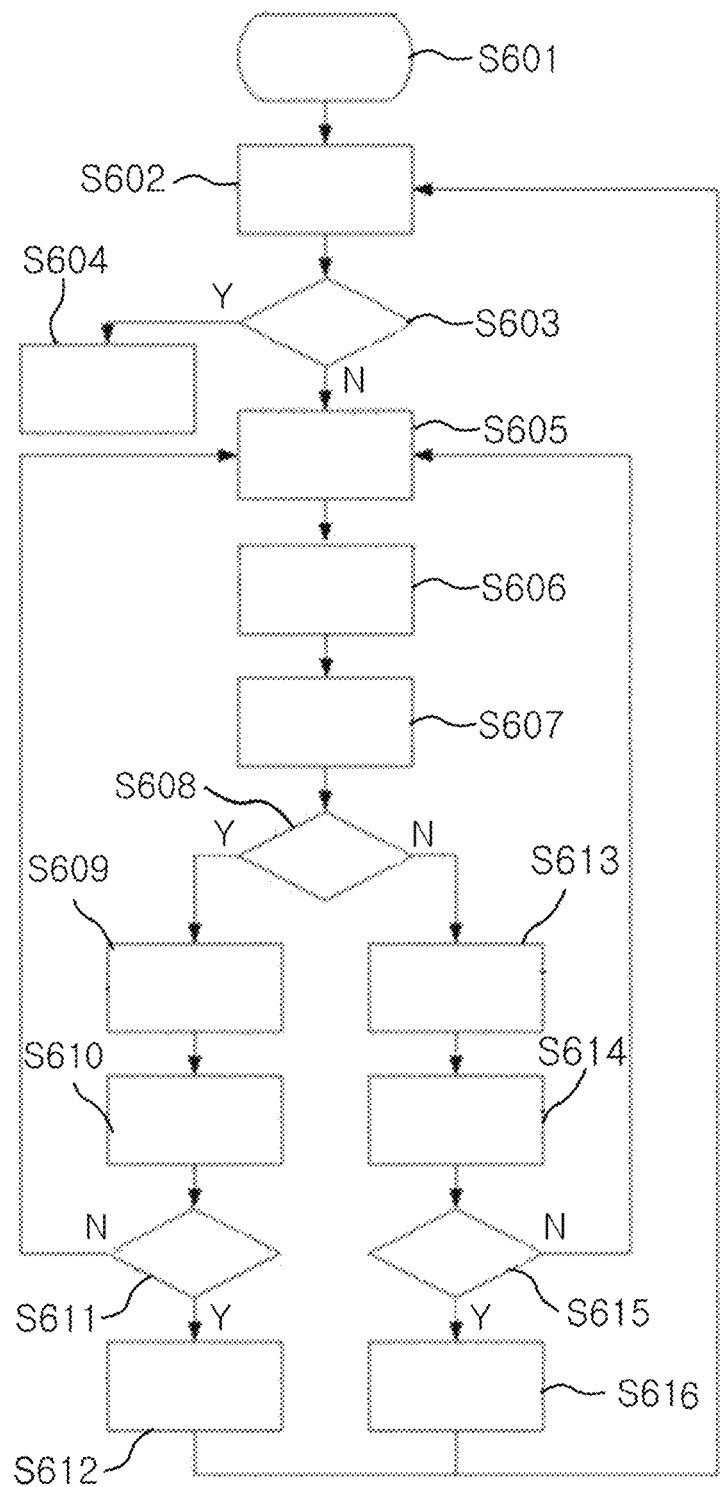
FIG. 6 is a flowchart illustrating determination of a moving direction by a moving unit of an autonomous wireless charging system based on power loss tracking according to the present invention.

FIG. 6 shows the operation of selecting (S601) the direction of the moving unit 4. First, the moving direction of the moving unit 4 is identified at step S602. It is determined whether the identified moving direction is determined at step S603. When the moving direction is determined, proceeding to step S604 of controlling the moving unit 4, a movement control process is performed. However, when the moving direction is not determined, moving to the right by a predetermined distance is performed at step S605 and the virtual position is updated at step S606. The power loss value is sensed again at step S607, and it is identified whether the sensed value is decreased at step S608. Herein, the decrease in the sensed value means that the power transmitting coil 2 of the moving unit 4 approaches to the center of the power receiving coil R of the wireless device S. Therefore, the right counter is increased at step S609, and the left counter is initialized at step S610. Then, it is identified whether the value of the right counter is a setting value at step S611. When the value of the right counter is the setting value, the right direction is selected at step S612 and the moving direction of the moving unit 4 is identified again at step S6012. When the value of the right counter is not the setting value, the moving unit 4 is moved to the right by a predetermined distance at step S605, the virtual position is updated at step S606, and the remaining steps are repeated. In contrast, when it is identified that the sensed value is increased or has the same value, the left counter is increased at step S613, the right counter is initialized at step S614, and it is determined whether the left counter has a setting value at step S615. When the left counter has the setting value, the left direction is selected at step S615, and the moving direction of the moving unit 4 is identified at step S602. When the left counter does not have the setting value, the moving unit 4 is moved to the right by a predetermined distance at step S605, the virtual position is updated at step S606, and the remaining steps are repeated.

Figure 7:
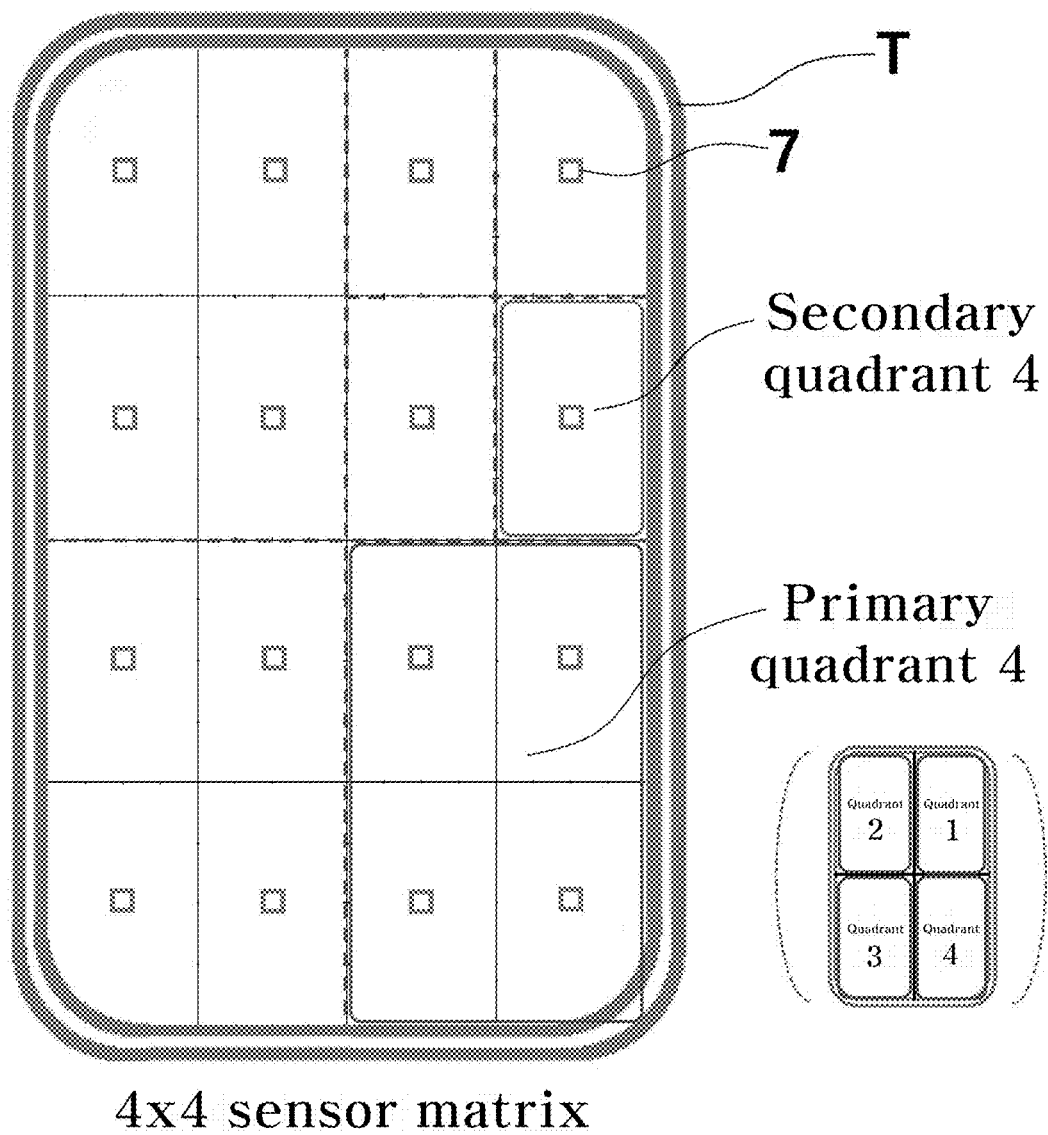
FIG. 7 is a diagram illustrating an example of a matrix of sensors to be selectively used when necessary, wherein the sensor matrix is used to determine a direction to a new position and inform the control unit when a position of a wireless device placed on a pad is displaced, in an autonomous wireless charging system based on power loss tracking according to the present invention.

Assuming that a smartphone S, which is an object to be wireless charged, is free-positioned, in the case where the position of the smartphone S is displaced due to the shaking of a vehicle, or the like, FIG. 7 shows an example of a matrix of 16 sensors 7 that are selectively used when necessary. The matrix of sensors 7 may be controlled in such a manner as to inform about the direction indicating which of four quadrants the smartphone is positioned on, in the case of displacement, and in such a manner as to track subdivided four quadrants depending on implementation. As the sensor 7, various types of sensors may be used. Assuming a weight sensor that can sense the weight of the smartphone S, which is about 200 g, is used, when Samsung Galaxy S9 is placed on a charging pad having an area of 100 mm×180 mm, it occupies about 57% of the area. Thus, about nine sensors 7 among 16 (=4×4) sensors 7 respond. This is operated even when the surface of the pad is slanted. Then, for each quadrant controlling four sensors 7, the number of the sensors 7 that have responded is counted. When a first quadrant having the biggest number of the sensors 7 that have responded is determined, the direction of the currently displaced smartphone S is identified. When the smartphone S in the middle of charge is picked up, there is no load on the weight sensors 7. Therefore, using this information, it is possible to distinguish between the displacement of the position and the removal of the smartphone S. Even when an object to be wireless charged is a small wireless rechargeable battery, the displaced direction is easily calculated. In this case, the position resolution is 25 mm (=100÷4) and 45 mm (=180÷4). In practice, in the case of precise movement based on a per-1 mm basis, the matrix of sensors 7 needs to have the sensors 7 arranged at positions that are integer multiples of 1 mm. In theory, in the present example, the power transmitting coil 2 is moved to the final displacement position by moving by 12.5 mm on the X axis and by 22.5 mm on the Y axis from the center of the cell of the sensor 7. The method of using the matrix of the sensors 7 is more efficient in calculating the direction when it is predicted that the sensor 7 becomes cheaper, smaller, and lighter.

Figure 8:
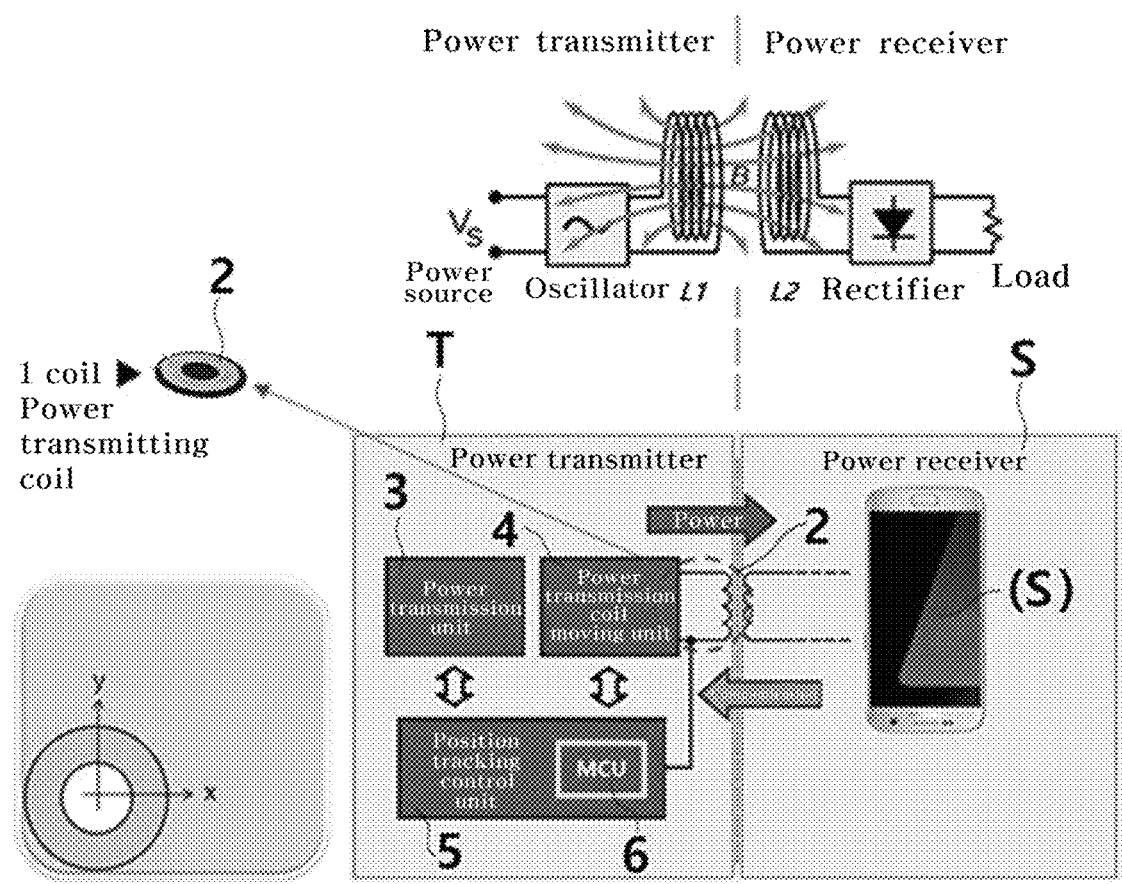
FIG. 8 is a diagram illustrating communication between a power transmitter and a power receiver; power transmission; an interoperational relationship set for movement of a transmitting coil; three main modules (a power unit, a moving unit, and a control unit) constituting the power transmitter; and an MCU (controller) positioned within the control unit.

The upper figure of FIG. 8 shows an air-core transformer structure as follows. Wireless charging using a magnetic induction method has a weak connection between the primary coil 2 of the power transmitter T and the secondary coil R of the power receiver S. The magnetic flux at the primary coil is induced to the secondary coil. The induced magnetic flux generates electromotive force at the secondary coil, so that power is transmitted to the secondary coil. The lower figure is equivalent to the upper figure. In the present invention, the autonomous wireless charging system (power transmitter T) based on power loss tracking is composed of three main modules, such as the power unit 3, the moving unit 4, and a control unit 5. An MCU (controller 6) in the control unit 5 intensively manages system operation control and processes, such as reading the power loss value, recognizing and tracking the position, stopping and moving the power transmitting coil 2 up, down, left, right, and the like. Herein, by periodically tracking the increase and decrease in the power loss value that is generated during a process of detecting a foreign object by the power transmitter T, the controller 6 precisely tracks the center position of the power receiving coil R of the power receiver S. Even when the position of the power receiver S is displaced, the controller 6 controls the power transmitting coil 2 of the moving unit 4 to move to that position.

FIG. 9 is a table resulting from an analysis for an autonomous wireless charging system using one transmitting coil 2. The system provides superior features and performances in terms of convenience, effective charging efficiency, freedom, cost effectiveness, and universality, compared to a system using one to three power transmitting coils in the related art. The addition of the moving unit 4 and the control unit 5 increases product production cost to some extent. However, one coil is used instead of two or three coils, a ferrite area is also reduced accordingly, and there is no need for expensive switching components required in the procedure of selecting one determined coil out of two or three coils given: these lead to great advantages in terms of cost and complexity. The power transmitter circuit T using the one power transmitting coil 2 is more stabilized than the product using two or three coils, so it is useful to reduce production cost in mass production. The power transmitter circuit T can be used for all smartphone (S) models without limitation, and always guarantees the optimum effective charging efficiency $E_{max}$ and simultaneously implements a true free-positioning autonomous wireless charger. Therefore, considering cost effectiveness, the power transmitter circuit T has more superiority than that of the existing product (technology) in terms of overall price competitiveness, product purchasing power, a variety of application fields, and the like.

Figure 10:
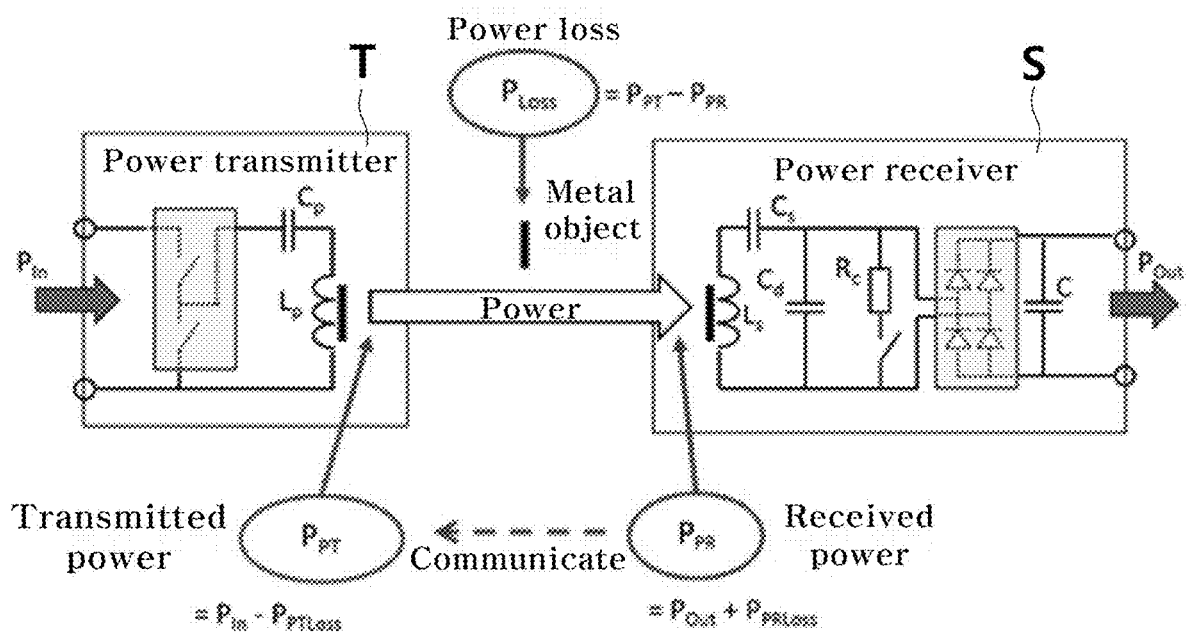
FIG. 10 is a diagram illustrating an example of a structure for estimating power loss in the transmit/receive channel so as to describe a function for detecting a foreign object according to an embodiment of the present invention.

FIG. 10 is a diagram defining a power loss that is importantly used in the present invention. The power loss is defined as the difference between the transmitted power and the received power when the power transmitter T transmits power to the power receiver S. Herein, a ping occurs between the power transmitter T and the power receiver S. In the case of attachment, three packets for signal strength, identification, and configuration are transmitted to enter a negotiation step. After the negotiation, a calibration step is entered. The power transmitter T uses so-called linear interpolation to adjust a transmitted power value and a received power value, estimates the adjusted power values to calculates a power loss value, and compares the value with a threshold to determine whether an object on the pad is a foreign object. When the object is identified as an object to be charged, the power transmitter T enters a power transmission step. The power transmitter T of the present invention, that is, the controller 6 in the control unit 5 of the autonomous wireless charging system based on power loss tracking uses a power loss value in Equation below so as to track the center position of the power receiving coil R of the power receiver S.

$$P_{loss}=P_{PT}-P_{PR} \quad \text{[Equation 1]}$$

That is, the power loss is defined as the difference between the transmitted power $P_{PT}$ and the received power $P_{PR}$. The controller 6 uses the value of $P_{loss}$ that is calculated by the power transmitter T, to control the movement of the power transmitting coil 2 into the direction in which the value of $P_{loss}$ decreases. Herein, $P_{loss}$ represents the power absorption of either a foreign object or an object to be charged. As shown in FIG. 10, the transmitted power $P_{PT}$ and the received power $P_{PR}$ are represented by $P_{PT}=P_{In}-P_{PTloss}$ and $P_{PR}=P_{Out}+P_{PRloss}$, respectively. Therefore, the transmitted power $P_{PT}$ is determined as an average power leaving the power transmitter T for a particular period of time. The received power $P_{PR}$ is determined as an average power consumed from the magnetic field in the power receiver S for a particular period of time. $P_{In}$ denotes the power value given at the input terminal of the power transmitter T. $P_{PTloss}$ denotes a power value consumed by an internal circuit (an inverter, a power transmitting coil, a resonant capacitor, a ferrite, and the like) of the power transmitter T. $P_{Out}$ denotes a power value given at an output terminal of the power receiver. $P_{PRloss}$ denotes a power value lost inside the power receiver S. The power transmitter T receives a received power packet from the power receiver S, calculates a power loss value $P_{loss}$, and compares the value with a threshold value.

As a preferred embodiment of the present invention, a tray-type case is employed, and the moving unit 4 of the autonomous wireless charging system based on power loss tracking with high hardware and cost efficiency is positioned at the center of the system and moves the power transmitting coil 2 only within the stroke zone. There is no need to charge the power receiver S positioned in all directions from the end to the end of the tray-type case. Therefore, it is reasonable to shorten the moving time and the charging time by moving the power transmitting coil 2 only by a predetermined stroke zone in up, down, left, and right directions. In addition, when the position of the power receiver S is displaced due to external vibration or impact, the controller 6 moves the power transmitting coil 2 again in a direction of the sensed position to continues the normal charging process for the power receiver S.

Figure 11:
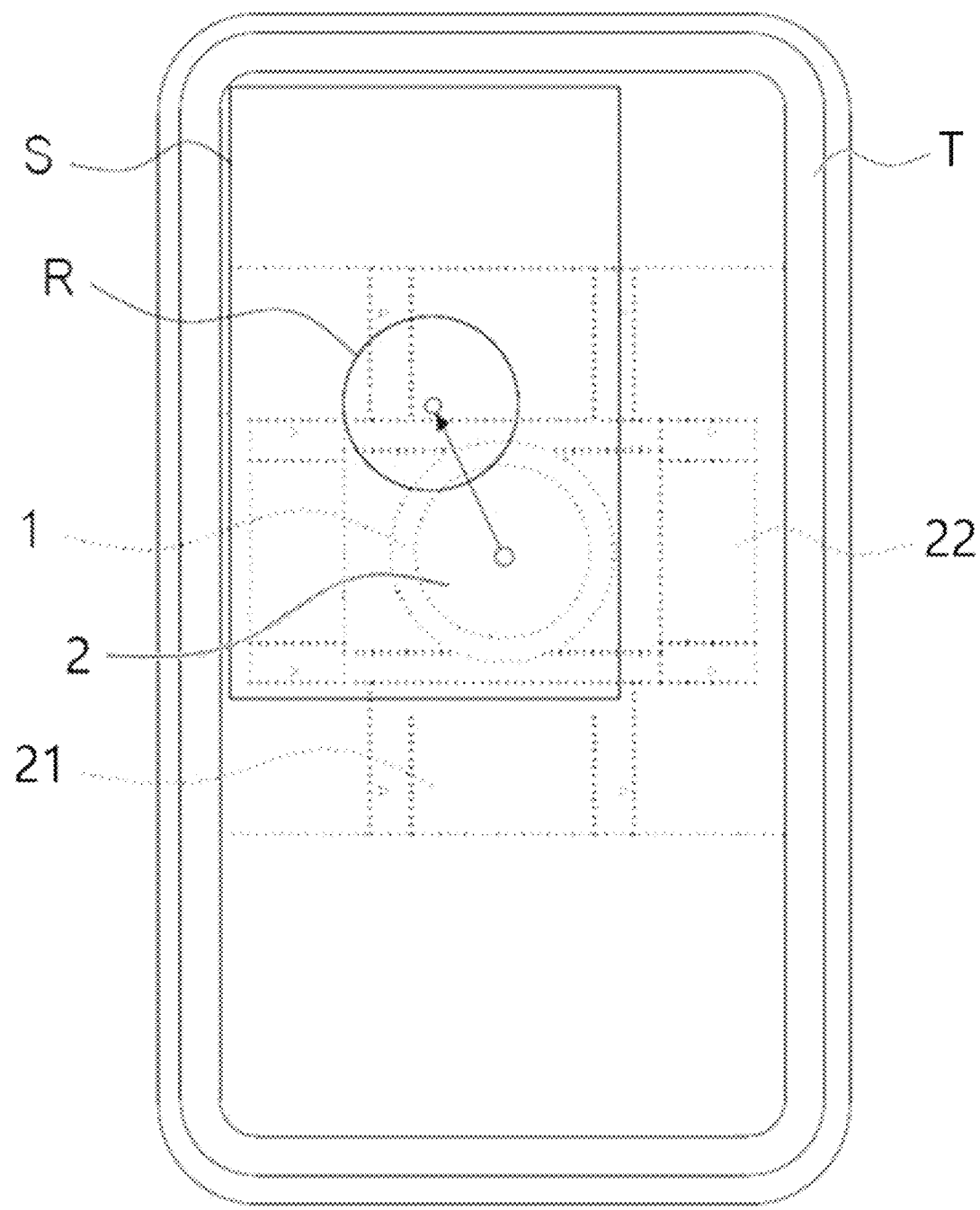
FIG. 11 is a diagram illustrating an example in which a moving unit among internal configuration modules of an autonomous wireless charger T based on power loss tracking moves a center of a power transmitting coil to a center position of a power receiving coil of a smartphone according to an embodiment of the present invention.

As show in FIG. 11, according to an embodiment of the present invention, in the autonomous wireless charging system T based on power loss tracking, among internal configuration modules, the moving unit 4 has an integrated structure of an X-axis rail 21, a Y-axis rail 22, and an X-axis motor 31 and a Y-axis motor 32, which are provided inside the respective rails. The moving unit 4 equipped with a ferrite 1 and the power transmitting coil 2 moves. In addition, without a position tracking circuit board, the moving unit 4 causes the power transmitting coil 2 to find and move to the center position of the power receiving coil R of the power receiver S.

Figure 12:
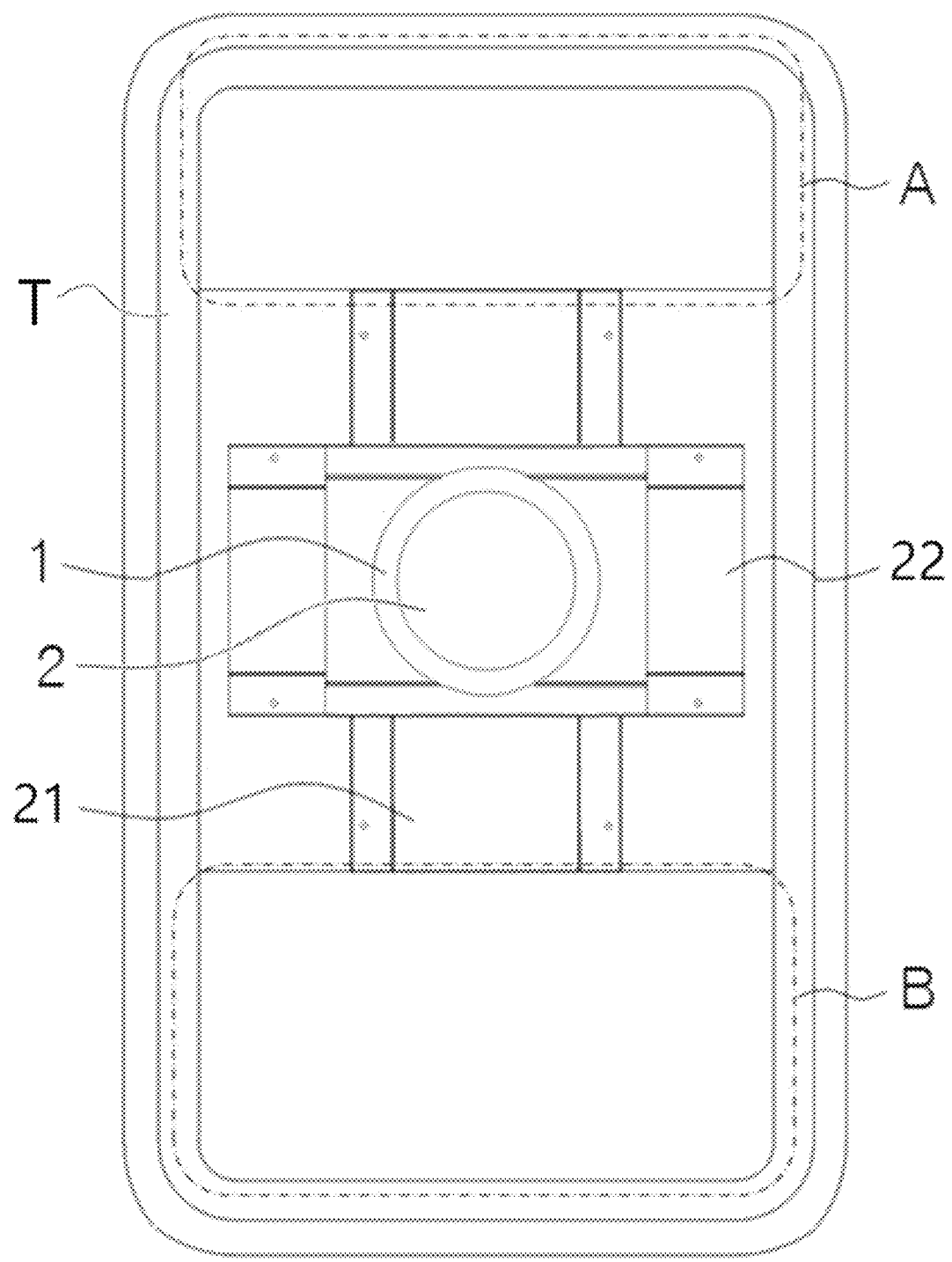
FIG. 12 is a diagram illustrating internal arrangement of main modules of an autonomous wireless charging system based on power loss tracking according to an embodiment of the present invention.

FIG. 12 shows an example in which the moving unit 4 is positioned in the center of the system T, according to an embodiment of the present invention. The moving unit 4 equipped with the ferrite 1 and the power transmitting coil 2 and composed of the X-axis rail 21, the Y-axis rail 22, and the like is provided at the center of the system so as to move in a shortest distance, to a place where the center position of the power receiver S is placed. A PCB for the control unit 5 and a PCB for the power transmission unit 3 are provided in available spaces A and B, respectively, whereby a problem of double stacking is resolved and the thickness of the wireless charging device is made slim. Herein, the power transmitting coil 2 with which the moving unit 4 is equipped may be implemented by extending the connection to the power transmission module with a flexible cable, such as a film cable.

Figure 13:
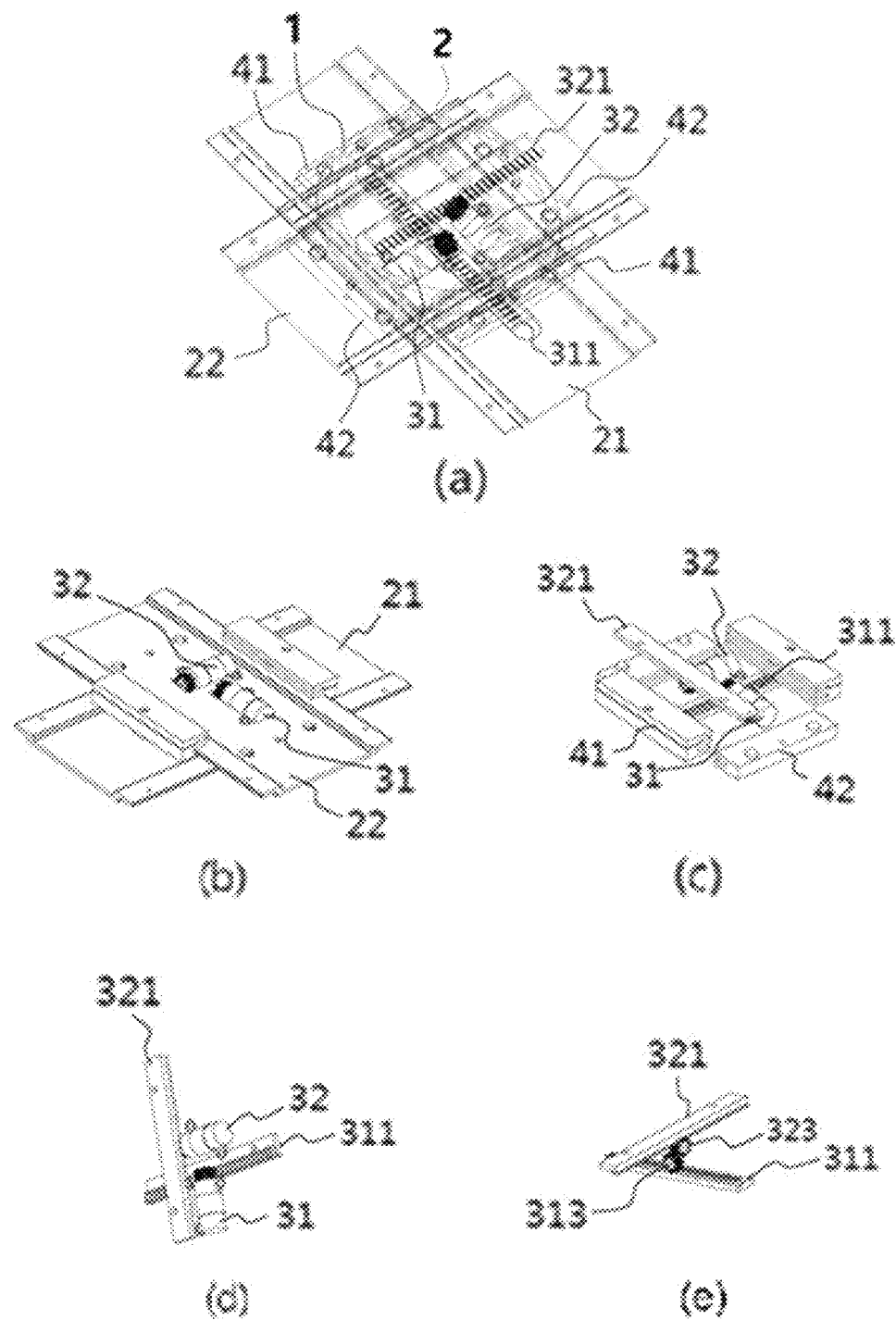
FIG. 13 is a diagram illustrating a mechanism design and configuration of a moving unit in detail in a transparent manner, for example, an X-axis rack gear, a gear fixedly coupled to an X-axis rail, a power transmitting coil, a ferrite, and the like, in an autonomous wireless charging system based on power loss tracking according to an embodiment of the present invention.

FIG. 13 shows the following. According to an embodiment of the present invention, the moving unit 4 moving the coil is composed of a second slide bearing 42, an X-axis rack gear 311, the X-axis motor 31, the Y-axis motor 32, and a first slide bearing 41, in the central part where the X-axis rail 21 and the Y-axis rail 22 cross along an X axis and a Y axis, respectively. The moving unit 4 is in conjunction with the control unit 5. The controller 6 is in conjunction with the power transmission unit 3 and the moving unit 4.

Regarding the movement of the power transmitting coil 2 to a predetermined position, as the X-axis motor 31 operates, the Y-axis rail 22 coupled to the second slide bearing 42 moves along the X-axis rail 21. Then, as the Y-axis motor 32 operates, a slider coupled to the Y-axis rail 22 moves in the direction of the Y-axis rail 22, thereby reaching the optimum position for wireless charging.

Specifically, the X-axis rail 21 is a device that is fixed across from one end to another end of a lower cover 2. Accordingly, the Y-axis rail 22 moving in a manner that is fixed on the X-axis rail 21 moves the power transmitting coil 2 quickly to a particular position.

The Y-axis rail 22 provided perpendicular to the X-axis rail 21 enables the power transmitting coil 2 coupled to the slider in a fixed manner, to move in the X-axis and the Y-axis direction and reach the optimum position for wireless charging.

The Y-axis rail 22 is a rail provided with the following: a first through-hole formed to surround the X-axis motor 31 therein; and a second through-hole formed to surround the Y-axis motor 32 provided perpendicular to the X-axis motor 31 so that the Y-axis motor 32 is not visible from the outside.

Herein, the X-axis motor 31 and the Y-axis motor 32 may be coupled to coupling holes formed in the Y-axis rail 22. When the X-axis motor 31 and the Y-axis motor 32 are viewed from the side, an area exposed above the coupling hole is the same as an area exposed below the coupling hole. The area exposed above the coupling hole is a space between the slider and the Y-axis rail 22 and is provided in such a manner not to obstruct the slider in moving along the Y axis. The area exposed below the coupling hole is a space between the Y-axis rail 22 and the X-axis rail 21 and is provided in such a manner not to obstruct the Y-axis rail 22 in moving along the X axis.

Therefore, the present invention may achieve removal of a dead space and stable movement (gentle movement, and removal of noise) by using a specialized structure in which a driving part (a driving motor, and a rack and pinion) is placed between a guide rail and a slider.

As shown in FIG. 13, according to the present invention, the X-axis rack gear 311 is fixed on an upper side of the X-axis rail 21 and is placed to engage with an X-axis pinion gear 313 of the X-axis motor 31. The second slide bearing 42 is positioned on each of opposite sides of the X-axis rail 21.

The X-axis motor 31 and the Y-axis motor 32 are inserted into the through-holes connecting the Y-axis rail 22 fixing the position of the X-axis motor 31 and the X-axis rail 21.

The Y-axis motor 32 is inserted into the through-hole 320 and fixed to the coupling hole formed on the Y-axis rail 22.

A bottom portion of the first slide bearing 41 that is formed in an E shape is coupled to each of the opposite end portions of the Y-axis rail 22.

Herein, the opposite sides of the Y-axis rail 22 are bent in the shape of stairs and the bent portions are inserted into the bottom portions of the first slide bearing 41, respectively.

A Y-axis rack gear 321 of the Y-axis motor 32 and a Y-axis pinion gear 323 that rotates by being engaged therewith are coupled.

The slider is coupled to the upper portion of the "E"-shaped form so that the slider moves to any position along the X axis.

The assembled X-axis rail 21 and Y-axis rail 22 are inserted into the lower cover, and only the X-axis rail 21 is fixed to the inner surface of the lower cover.

Therefore, the X-axis rail 21 does not move, but the Y-axis rail 22 above the X-axis rail 21 moves in the X-axis direction. After the Y-axis rail 22 moves to any position in the X-axis direction, the slider moves to any position in the Y-axis direction.

In FIG. 14, in the autonomous wireless charging system of the present invention, the control unit 5 drives the moving unit 4 in the direction in which the power loss value decreases, so that the center position of the power transmitting coil 2 is moved to the center position of the power receiving coil R. For such an operation, the power loss value needs to have a consistent increase and decrease characteristics so that the moving unit 4 moves for aligning the center of the power transmitting coil 2 with the center of the power receiving coil R by only using the change in the power loss value without using a position detection circuit board. In FIG. 14, it is determined that the position of the power receiving coil R is coordinates (0, 0). With respect to rectilinear trajectories in nine directions, the power loss values are measured while the power transmitting coil 2 is moved on a per-1 mm basis or a per-integer times 1 mm basis up to 7 mm to 14 mm on the X axis and the Y axis. FIG. 14(a) shows the distribution of power loss values according to the measurement direction and position. It is shown that as the distance between the power transmitting coil 2 and the power receiving coil R increases, the loss value continuously increases. FIG. 14(b) is a graph of power loss values measured for rectilinear trajectories in nine directions. It is a diagram that more clearly illustrates whether an increase in the loss value shows consistent behavior. Combining the distribution diagram and the graph, it is found that the behavior of the power loss value according to the increase and decrease in the distance between the power transmitting coil 2 and the power receiving coil R shows a characteristic of increasing and decreasing in a stable pattern. Therefore, in order to track the center position of the power receiving coil R, it is possible to effectively apply the power loss value generated in the process of detecting a foreign object.

Therefore, the present invention may be applied not only to a tray-type case that limits the mounting position of the wireless device S, but also to a number of methods in which the controller 6 moves the mounting position to various objects to be charged (a wireless rechargeable smartphone, a wireless rechargeable vehicle, a wireless rechargeable mouse, a wireless rechargeable receive device, and the like) as show in FIGS. 15 to 18 through the autonomous wireless charging system based on power loss tracking.

Figure 15:
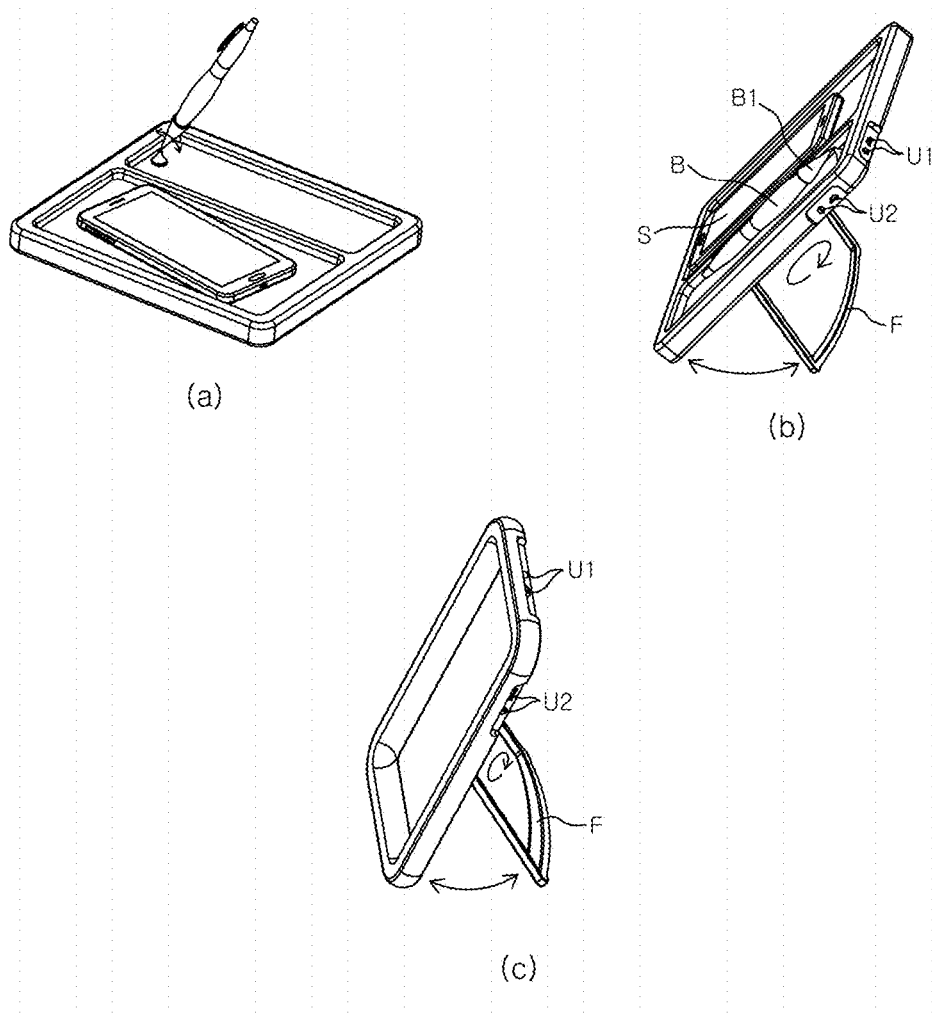
FIG. 15 is a diagram illustrating an embodiment in which a combination of stationery and charger and a tray-type charger are used in the form of both a pad and a rotary stand, in an autonomous wireless charging system based on power loss tracking according to an embodiment of the present invention.

As shown in FIG. 15, the present invention may be applied to any one of the following: a combination of stationery and autonomous wireless charger (a), (b), and a tray-type autonomous wireless charger T (c). In the case of the combination of stationery and autonomous wireless charging application product (a), (b), a module for the moving unit 4 is placed at the bottom of the charging pad, and PCBs for a control module and a power transmitting module are placed at the bottom of a stationery tray where a pen, or the like is positioned.

Figure 16:
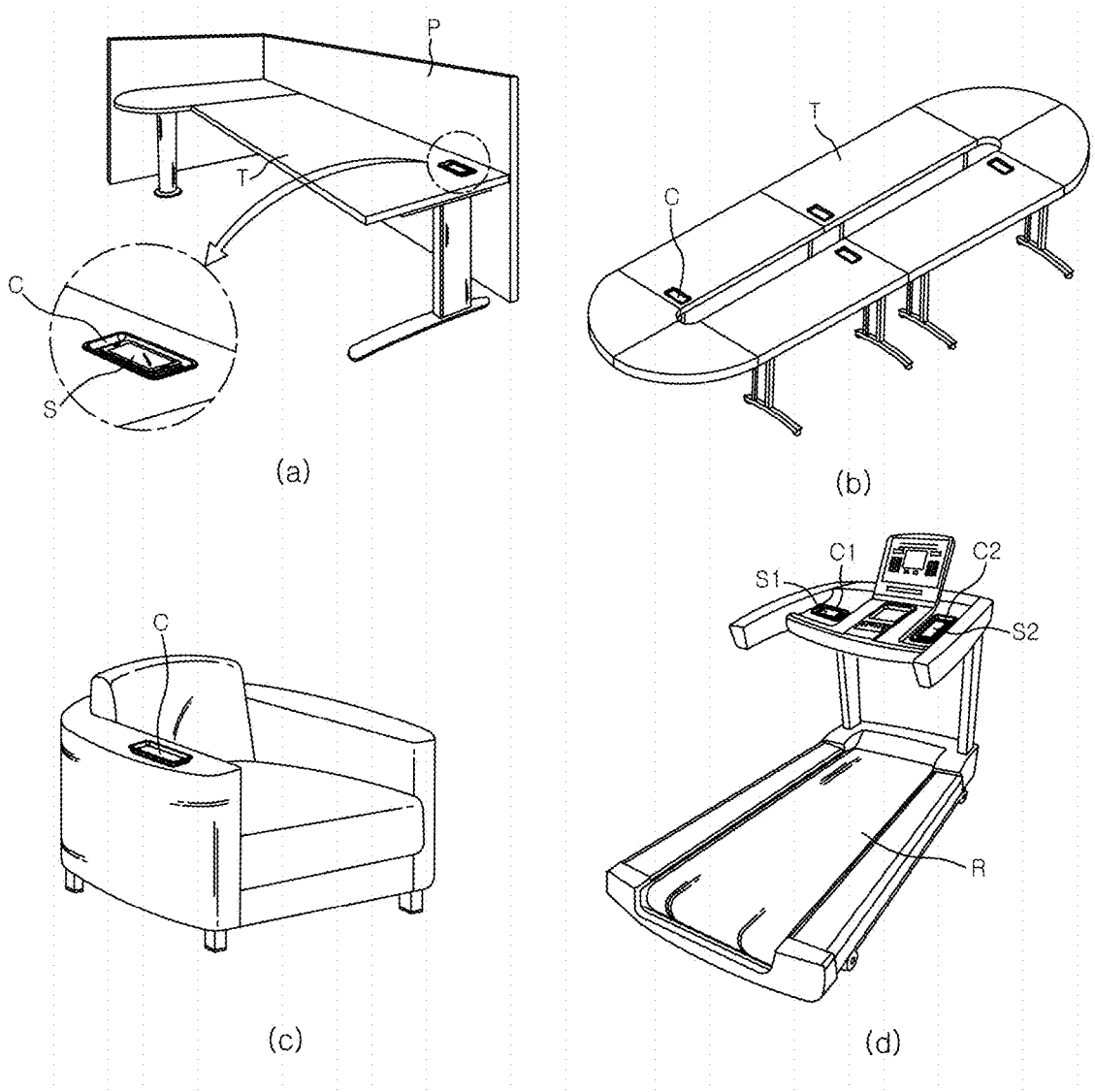
FIG. 16 is a diagram illustrating an example of built-in type embodiments in furnitures such as office and conference room desks, sofas, and the like; treadmill infrastructure of an autonomous wireless charging system according to an embodiment of the present invention.

In addition, as shown in FIG. 16, the present invention may be applied to any one among furniture (a), (b), (c), such as an office and conference room desk, a sofa, and a treadmill (d), in a built-in type. If the system of the present invention is embedded in a building or furniture infrastructure, it creates excellent application points for a smart office and smart furniture that always provide the optimum effective charging efficiency as well as decisive convenience.

Figure 17:
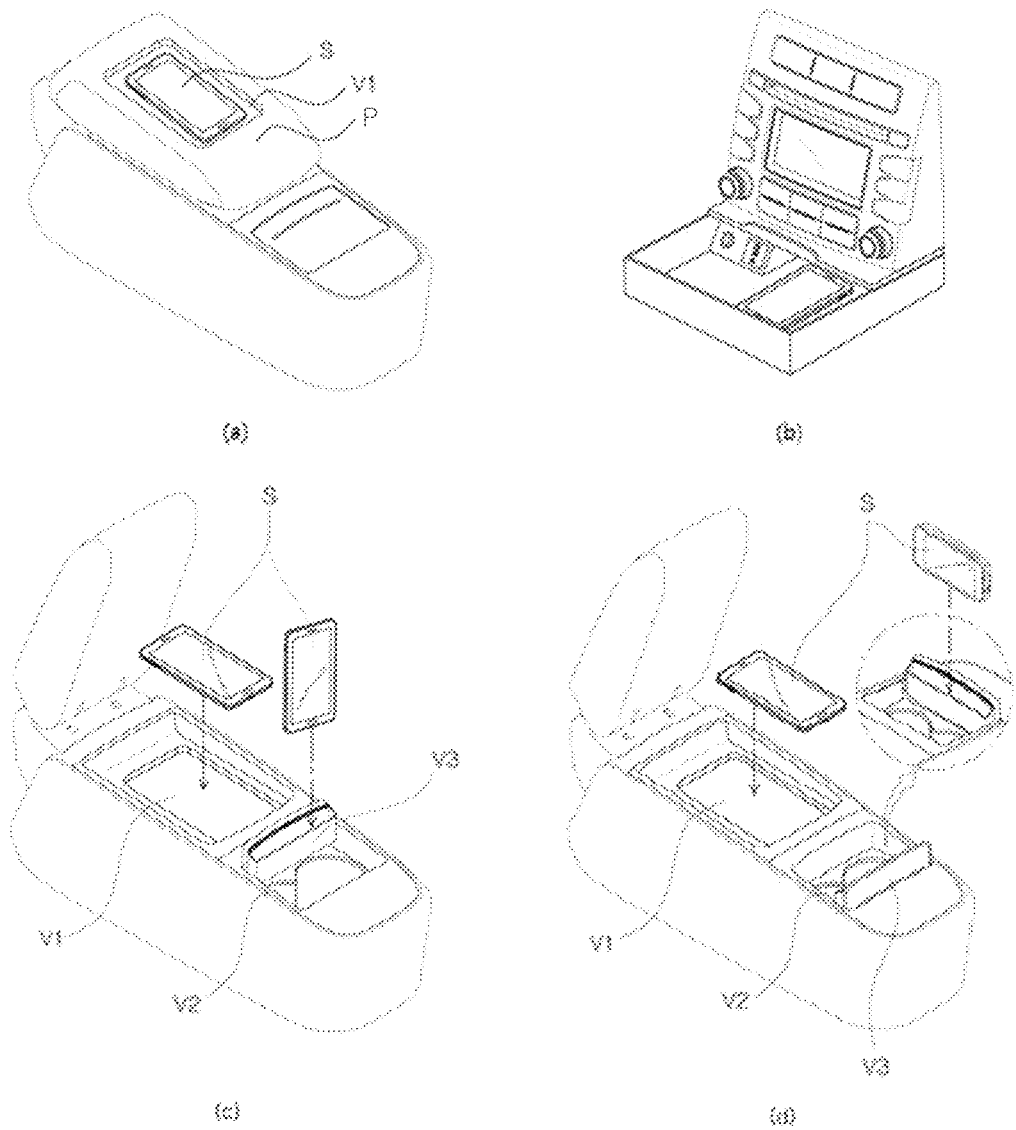
FIG. 17 is a diagram illustrating built-in type embodiments provided on and inside a console, in an available space behind a mug cup holder of an autonomous wireless charging system based on power loss tracking according to an embodiment of the present invention.

In addition, as shown in FIG. 17, the present invention may be applied to either certain positions on and inside a right front console of the driver's seat or an available space behind a mug cup holder (a), (c), and (d), and a front console in the front of a vehicle (b) where the user's hand and view are easily reached, in the form of a horizontal storage type, an slanted stand type, a laterally standing type, and a pocket insertion type. If the system of the present invention is embedded in infrastructure of various vehicles (sedans, SUVs, trucks, motorcycles, and the like) that are susceptible to shaking, it creates excellent application points for smart vehicles that always provide the optimum effective charging efficiency as well as decisive convenience.

In addition, as show in FIG. 18, the present invention may be applied to any one among a charging pad (a) for both a wireless rechargeable gaming mouse and a smartphone, and a garage and a parking lot using an overground pad (b) or a underground pad (c) for charging electric vehicles. Since a wireless charging system for electric vehicles can use the same method as wireless charging for smartphones S, excellent expandability is provided. In addition, even if the driver is unable to see below during parking, even if the driver does not align the wheels with the parking line exactly, even if there is no parking stopper, the optimum charging is provided even though the driver parks roughly. In addition, according to the present invention, after multiple electric vehicles are parked side by side at the parking lines, the power transmitting coil 2 installed on or under the ground is moved within the stroke zone along the X-axis rail 21 and the Y-axis rail 22 of the present invention so that the power transmitting coil 2 and the power receiving coil R are positioned on the coaxial line, whereby hardware and cost efficiency of a charging station increase, such as reduction in hardware cost, power saving, and the like.

In addition, according to an embodiment of the present invention, in the cases of FIGS. 12, and 15 to 18, the power transmitting coil 2 with which the moving unit 4 is equipped is implemented by extending the connection to the power transmission module with a flexible cable, such as a film cable. In addition, in order to minimize electromagnetic interference (EMI) to the PCBs provided in the upper, the lower, the left, and the right of the moving unit 4 and to create a slim charging system through space-saving arrangement of modules, the ferrite 1 may be manufactured in an engraved shape surrounding the power transmitting coil 2.

DESCRIPTION OF THE REFERENCE NUMERALS IN FIGS. 15 TO 18

S, S1, S2: wireless device
B: Ball pen
B1: Ball pen holder
U1, U2: USB & power terminal
F: Stand
C, C1, C2: Tray-type charging part
T: Table
P: Console cover
V1: Storage and charging part
V2: Cup holder
V3: Door and charging part

The invention claimed is:

1. An autonomous wireless charging system based on power loss tracking, comprising:
   a tray-type case;
   a controller configured to set a basic value or a threshold value based on a power loss value generated in a process of detecting a foreign object;
   a power transmitting coil configured to be moved within a predetermined time in a direction of a tracked position through periodic monitoring of the power loss value so that a wireless device is autonomously charged, and
   circuitry configured to calculate, by using a matrix of sensors, displacement of the position of the wireless device, whether the wireless device is removed, and a displaced direction of the displaced wireless device so as to move the transmitting coil again,
   wherein, when a position of the wireless device is displaced, position tracking is performed again;
   wherein the wireless device is configured to be placed within the tray-type case, and
   wherein a range of movement of a center of the power transmitting coil is restricted to a stroke zone of the tray-type case that is defined by all points that are reachable by a center of a power receiving coil of the wireless device during two-dimensional movement of the wireless device within the tray-type case.

2. The autonomous wireless charging system of claim 1, wherein the autonomous wireless charging system charges the wireless device and comprises:
   the controller provided inside the autonomous wireless charging system, and detecting the position of the wireless device; and
   a moving unit moving the power transmitting coil only within the stroke zone in cooperation with the controller.

3. The autonomous wireless charging system of claim 2, wherein the moving unit uses an X-Y guide employing a slide bearing method in which a driving part is placed between a guide rail and a slider.

4. The autonomous wireless charging system of claim 1, wherein the autonomous wireless charging system is applied to an internal charging device of any one among a combination of stationery and charger; a tray-type charger; furniture including an office desk and a sofa; a treadmill; a front console for a vehicle; a wireless rechargeable gaming mouse pad; a smartphone charging pad; and a garage and a parking lot using an overground or underground pad for charging an electric vehicle.

5. The autonomous wireless charging system of claim 2, wherein the autonomous wireless charging system is applied to an internal charging device of any one among a combination of stationery and charger; a tray-type charger; furniture including an office desk and a sofa; a treadmill; a front console for a vehicle; a wireless rechargeable gaming mouse pad; a smartphone charging pad; and
   a garage and a parking lot using an overground or underground pad for charging an electric vehicle.

6. The autonomous wireless charging system of claim 3, wherein the autonomous wireless charging system is applied to an internal charging device of any one among a combination of stationery and charger; a tray-type charger; furniture including an office desk and a sofa; a treadmill; a front console for a vehicle; a wireless rechargeable gaming mouse pad; a smartphone charging pad; and a garage and a parking lot using an overground or underground pad for charging an electric vehicle.

* * * * *